United States Patent [19]

Waite

[11] Patent Number: 4,913,816

[45] Date of Patent: * Apr. 3, 1990

[54] CHLORINE TOLERANT COMPOSITE SEMIPERMEABLE MEMBRANE

[75] Inventor: Warren A. Waite, Burlington, Mass.

[73] Assignee: Ionics Incorporated, Watertown, Mass.

[*] Notice: The portion of the term of this patent subsequent to Feb. 7, 2006 has been disclaimed.

[21] Appl. No.: 278,524

[22] Filed: Dec. 1, 1988

Related U.S. Application Data

[63] Continuation-in-part of Ser. No. 190,204, May 4, 1988, Pat. No. 4,802,984.

[51] Int. Cl.$^4$ .............................................. B01D 13/00
[52] U.S. Cl. ................................ 210/490; 210/500.34; 210/500.35; 210/500.37
[58] Field of Search .................. 427/244, 245, 246; 210/500.42, 500.35, 490, 500.34, 500.37

[56] References Cited

U.S. PATENT DOCUMENTS 4,802,984 2/1989 Waite .......................... 210/500.35 X

*Primary Examiner*—Frank Spear
*Attorney, Agent, or Firm*—Norman E. Saliba

[57] ABSTRACT

A thin film composite (TFC) semipermeable membrane on a semiporous substrate is produced by an interfacial polymerization reaction between (1) an aqueous phase comprising a blend of water soluble and water dispersable compounds, (the latter being a chlorine or other oxidant neutralizer which protects the resulting semipermeable membrane from short term damage by chlorine or other oxidants) and (2) an organic phase comprising polyfunctional crosslinking reagents capable of reacting and/or polymerizing with one or more of the ingredients of said aqueous phase.

9 Claims, No Drawings

CHLORINE TOLERANT COMPOSITE SEMIPERMEABLE MEMBRANE

PREFACE

This application is a continuation-in-part of co-pending application Ser. No. 07/190,204 filed May 4, 1988 and assigned to a common assignee, now Pat. No. 4,802,984.

FIELD OF THE INVENTION

This invention relates to chlorine tolerant thin film composite membranes used for the selective removal of solids (solutes) from chlorinated (or oxidized) fluid mixtures or solutions (usually water). In particular this invention relates to a dual layer membrane in which the ultra thin polymeric layer (capable of accepting chlorine or other oxidants) is supported on a microporous chlorine resistant support layer.

BACKGROUND OF THE INVENTION

Salt and solute rejecting membranes suitable for use in desalination of aqueous solutions are the subject of numerous patents. Cadotte, U.S. Pat. No. 4,277,344 discloses permselective (salt rejecting) multi-layer membranes in which there is a microporous polysulfone substrate layer and a juxtaposed polyamide layer made from an aromatic triacid halide and an aromatic diamine. Scala et. al. U.S. Pat. No. 3,744,642 discloses multilayer membranes in which one layer is a porous substrate and the juxtaposed layer is a polyamide, a polyphenyl ester, or a polysulfonamide. Hara et.al. U.S. Pat. No. 4,353,802 discloses semipermeable composite membranes in which the membrane material is cross-linked using polyfunctional aromatic acid halides. Kamiyama et.al. U.S. Pat. No. 4,619,767 discloses permselective multi-layer membranes having a (1) microporous substrate layer (2) an ultra thin layer of a cross-linked polyvinyl alcohol/amino compound and (3) a porous inner layer of water insoluble polyvinyl alcohol located between the porous substrate and ultra thin layer. Other patents disclosing the preparation and properties of thin film composite membranes are U.S. Pat. Nos. 3,951,815; 4,005,012; 4,039,440 and 4,277,344.

A discussion of chlorine tolerance of reverse osmosis membranes of all types, be they anistropic or thin film composite is presented by Robert J. Petersen in a 1986 paper entitled "The Expanding Roster of Commercial Reverse Osmosis Membranes". It was stated in this report that thin film composite membranes in which the thin polyamide layer was composed of the reaction product of trimesoyl chloride and piperazine had the best chlorine tolerance up to that time for a polyamide TFC membrane, but that these might not be fully resistant to chlorine degradation despite the claims. These membranes are indeed not fully resistant to chlorine while membranes of the present invention are much superior in their resistance to this oxidant at normal operational hyperfiltration pH regions (or values). Thin film composite (TFC) membranes appear to the most efficient reverse osmosis (R.O.) membranes known today. These membranes are conveniently made by interfacial condensation polymerization to yield ultra thin films at the interface of an aqueous phase layer and a non-aqueous or organic (solvent) phase layer. Since the two phases are substantially immiscible, an ultra thin film will be generated at the interface of the two layers. Since the reaction is diffusion controlled and self limiting, the method yields ultra thin films, typically 50–5000 Å thick (1 Å = $10^{-8}$ cm.).

BRIEF DESCRIPTION OF THE INVENTION

The water or aqueous phase employed in the prior art, with the exception of the afore-mentioned co-pending application (Ser. No. 07/190,204), typically contains only those ingredients that are water soluble such as for example, surfactants, amines, acid acceptors and the like. In said co-pending application there is described another addition to the aqueous phase. These are "water insoluble" ingredients in the forms of water emulsions or dispersions of natural and/or synthetic latexes comprised of water insoluble polymers or copolymers. The use of these latexes or emulsions makes possible the fabrication of a novel series of latex bonded or modified thin film composite membranes possessing most desirable properties of high flux rates and improved rejection rates. The incorporation of emulsions in the aqueous phase of the membrane manufacturing system permits one to modify the physical and chemical properties of the membranes to allow their use in more demanding thermal, mecanical, and chemical environments. This present application discloses an extension of the latex addition to the water phase of the reaction sequence whereby, certain reducing polymers, most notably those possessing carbon-carbon double bonds or those possessing aromatic reducing polymers such as phenolic resins (i.e. phenolic compounds chlorinate readily and thus are reduced agent polymers) are added to the TFC membrane system and are thereby available to react with chlorine containing solutions (i.e. chlorinated feedwater) and absorb (react) same without immediate damage to the thin film composite polyamide. This is illustrated by the addition of a reducing polymer such as a latex of butadiene-styrene and allowing it to scavenge chlorine at neutral pH values (i.e. pH = 5 ± 0.5) as shown below:

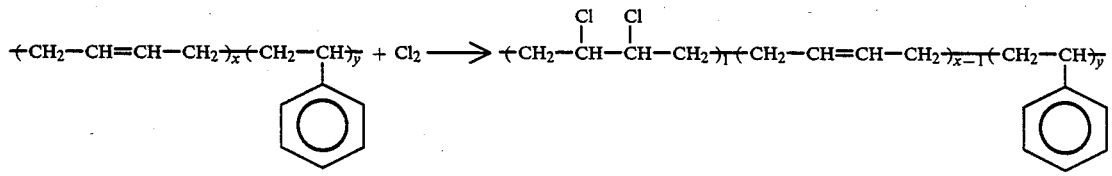

Subsequent examples will show the use of reducing polymers for preparing thin film composite membranes having improved tolerance to parts per million of chlorine in saline feed waters (to be separated by R.O.) by scavengering $Cl_2$ then TFC membrane prepared with identical polyamides but without the benefit of reducing latexes.

The number and types of emulsions (dispersions, latexes) that can be blended with water solutions of amines, surfactants, caustic, etc. is almost limitless. The blending of monomeric or polymeric emulsions, which are capable of scavenging oxidants (such as chlorine), with the desired water soluble ingredients allows one to enhance specific properties of the finished membrane. If these emulsions contain chlorine or oxidant scavengers, it will allow extension of the TFC membranes useful life by decreasing attack on the ultra thin polyamide separation film. Typically the use of a polybutadiene emulsion would result in a membrane having improved chlorine resistance, improved flexability, and give body to the thin polyamide film so formed.

The properties and performance characteristics of the thin film composites is significantly determined by the ingredients in the aqueous phase system, both the water soluble components and the non-water (organic) soluble emulsions. The organic phase system is usually limited to ingredients that are soluble (in) and inert to rapidly evaporating solvents such as hexane, fluorochlorohydrocarbons, etc. Such ingredients dissolved in the solvents are normally very reactive cross-linking agents such as trimesoyl chloride, organic di-isocyanates, etc.

DETAILED DESCRIPTION

The procedures of Kamiyama, U.S. Pat. No. 4,619,767 are illustrative of the conditions needed for preparing composite membranes of the present invention. The process consists essentially of several steps:

A microporous substrate with pores in the range of 0.005 to 0.5 microns in diameter is prepared. This may be accomplished preferably with a polysulfone linear polymer, cast from a 15% solution thereof in dimethyl formamide solvent and immediately quenched in water to precipitate the polysulfone membrane and extract its solvent.

This base membrane substrate (dried and stored, or fresh and wet) is then equilibrated with the "water phase" solution containing the desired emulsion, amino compound, etc.; and the excess solution removed from the surface by some draining, rolling or sponging procedure. The concentration of the components in the "water phase" solution is an important factor in the performance of the resulting composite.

The loaded substrate is then immersed in the "organic phase" solution containing the polyfunctional cross-linking agent in a solvent such as hexane or mixtures thereof (solvents which do not adversely affect the porous structure of the polysulfone substrate) for 5–90 (preferably 15–35 secs.) at room temperature.

The resulting composite is then dried at temperatures of 20° C.–100° C. (preferably 50° C.–70° C.), for periods of 5–180 sec., (preferably 15–60 secs.) to establish adhesion of the surface film to the polysulfone substrate. The residual components and reaction by-products are extracted by soaking in water.

It is normal practice to treat feed waters with small amounts of chlorine so as to kill harmful microorganisms present in the water. After chlorination it becomes necessary to remove any residual chlorine and other oxidants remaining in the feed prior to reverse osmosis treatment since such oxidants are known to damage the polyamide thin film of the membrane and substantially reduce their performance resulting in premature failure. Removal of residual chlorine in the feed water by reaction with the reducing latex polymer protects the polyamide thin film. The latexes (emulsions) used in the present invention are dispersions of water insoluble, natural or synthetic polymers or copolymers having functional groups either appendening or comprising the polymeric chains, which react with and essentially reduce small quantities of chlorine/hypochlorite or other oxidizing agent contained in a feed solution being treated for salt removal. The vast majority of synthetic latices are prepared directly by emulsion polymerization and have particle sizes (in aqueous dispersion) of 500–1500 Å (005–0.15 microns) prior to film casting. A very large number of synthetic latices are available commercially and are readily blended into the thin film membranes of the invention. Such latices include for example nitrile latexes (aqueous, anionic dispersions of butadiene-acrylonitrile copolymers); styrene-butadiene latexes, styrene-butadiene-4-vinyl pyridine latexes, phenolic latexes, resorcinol-formaldehyde latexes, and other latexes which will reduce chlorine hypochlorite, or other oxidants such as hydrogen peroxide, ozone, or permanganate solutions.

On the other hand, these TFC membranes can also be prepared with latexes like acrylic latexes (aqueous anionic dispersions of copolymers of acrylic esters); vinyl and vinylidene chloride polymer latexes; polyvinyl chloride-acrylic copolymer latexes, vinylidene fluoride polymer latexes and others. The latter group of lattices, collectively, contain no double bonds or reducing phenolic or resorcinol groups and it will be shown in the following examples that the former group are chlorine tolerant when incorporated in TFC membranes while this latter group gives TEF's having much reduced chlorine tolerances.

The above two classes of latexes (reducing and non-reducing) are available whereby the polymers or copolymers resulting therefrom will vary as to their hardness, flammability, adhesive qualities, antioxidant properties, temperature flexibility, chemical resistance, etc. These latexes are commercially available from certain major chemical producers and suppliers. The term latexes, emulsions and dispersions are used interchangably herein to have the same meaning.

The amino compound used in this invention are enumerated in U.S. Pat. No. 4,619,767; namely piperazine, a secondary amine having

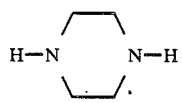

two (N—H) groups so as to react with a mixture of isotholoyl chloride

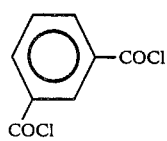

and trimesoyl chloride

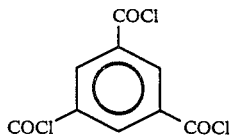

to form a thin film polyamide in the presence of latex onto a microporous polysulfone sheet to form the invention.

To those knowledgeable in the art, any combination of bifunctional or multifunctional amines could be used to interfacially polymerize with any difunctional, trifunctional or polyfunctional acyl chloride (or other halide) so as to form a crosslinked thin film polyamide interfacially. Any latex may be present in the aqueous phase of the interface system so as to become a mixed part of the TFC layer drying.

As such amino compounds, there are, for example those represented by the following:

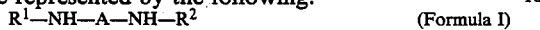

$R^1$—NH—A—NH—$R^2$ (Formula I)

wherein A represents an alkene group having from 2 to 8 carbon atoms, a divalent alicyclic group, a divalent aromatic group, or a divalent heteroaromatic group, (Formula V) and $R^1$ and $R^2$ each represents an alkyl group having from 1 to 3 carbon atoms;

Formula II

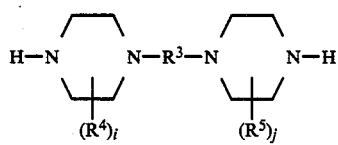

wherein $R^3$ represents an alkylene group having from 0 to 4 carbon atoms, $R^4$ and $R^5$ each represents an alkyl group having from 1 to 3 carbon atoms, and i and j represents an integer of 0 to 4.

Formula III

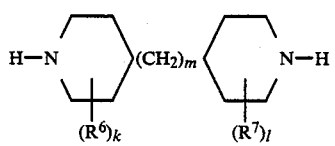

wherein $R^6$ and $R^7$ each represents an alkyl group having from 1 to 3 carbon atoms, k and l each represent an integer of 0 to 4, and m represents an integer of 0 to 4; and Formula IV

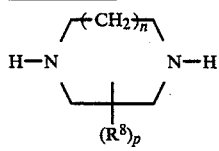

wherein $R^8$ represents an alkyl group having from 1 to 3 carbon atoms, n represents 0, 1, or 2, and p represents an integer of 0 to 4.

Preferred examples include:

FORMULA I

N,N'-dimethylethylene diamine, N,N'-dimethyl propylene diamine, N,N'-dimethyl-m-phenylene diamine, N,N-dimethyl-p-phenylene diamine, 2,6 dimethyl 4-amino piperidine, etc.

Formula II

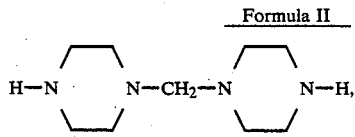

-continued
Formula II

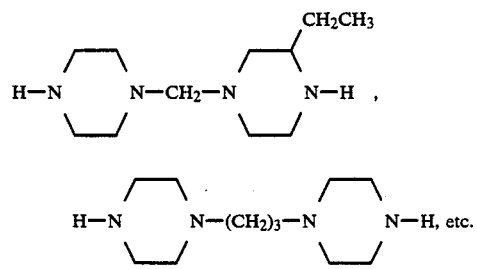

Formula III

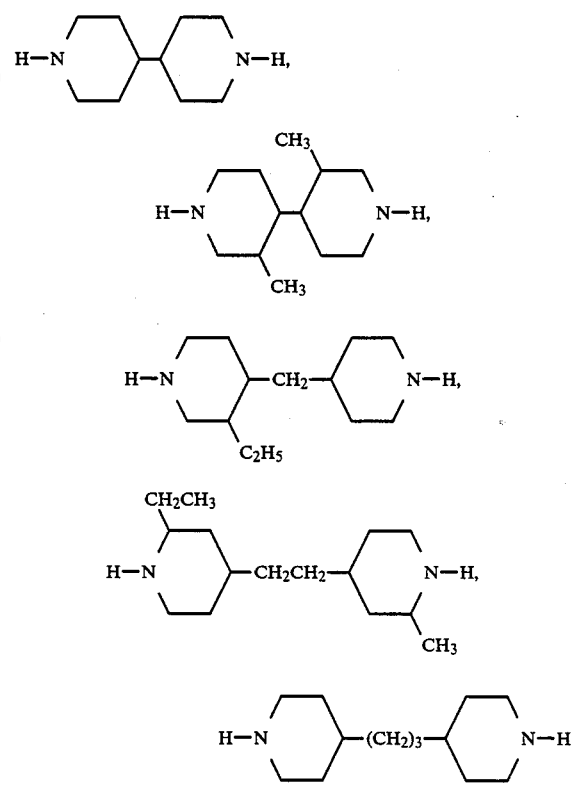

FORMULA IV

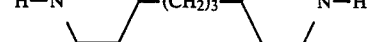

Piperazine, 2-methylpiperazine, 2,5-dimethyl piperazine, etc.

The above listed amino compounds can be used alone or as a mixture of two or more thereof.

This composite semipermeable membrane is prepared according to the present invention which comprises a process of coating or impregnating a porous substrate with an aqueous solution containing a water soluble or dispersable latex containing carbon-carbon double bonds in the organic polymer structure of the latex or possess reducing organic chemical groups in the latex polymer. The latter may be phenolic, catecholic, hydroquinonic, resorcinolic, or any other organic functional group polymeric material capable of being easily oxidized by chlorine or hypochlorite salts and an amino compound having at least two secondary amino groups in the molecule, thereafter contacting the porous substrate with a polyfunctional crosslinking reagent capable of reacting with secondary amino groups to polymerize the amino compound by crosslinking, and then heating the product to remove solvents and/or postcure polyamide.

The aqueous phase solution is prepared such that the amino compound is contained therein in an amount of from 10 to 500 parts by weight, and preferably from 20 to 300 parts by weight, based upon 100 parts by weight of the reducing polymer latex solids, and the total content of the latex solids and the amino compounds is from 0.05 to 10% by weight (preferably from 0.1 to 5% by weight). This solution may contain a surface active agent for reducing surface tension in the case of coating or impregnating the porous substrate. The thickness of the ultrathin film (which depends upon the concentrations of the latex component and the amino compound in the aqueous solution and the contacting time with the crosslinking reagent) is generally from 50 to 1000 Å, (preferably from 100 to 500 Å). If the ultrathin film is too thin, partial defects are caused on the film surface. On the other hand, if it is too thick, the water permeability decreases.

The porous substrate used in the present invention is suitably a membrane having an asymmetric structure wherein the surface pore size is generally from 50 to 500 Å. For example, polysulfone, polyether sulfone, or polyvinylidene fluoride can preferably be used.

Particularly, polysulfone is preferable for preparation of this porous base film substrate because of its demonstrated oxidative stability. The porous membrane may be reinforced by backing with a fabric or a non-woven web.

The polyfunctional crosslinking reagent used in the present invention is a compound having 2 or more functional groups capable of reacting with primary or secondary amino groups or any other organic functional group possessing a reactable proton such as the hydroxy group, amide groups, mercaptan groups, or mixtures thereof, for example, one ore more kinds of acid halide groups, halogen sulfonyl groups, N-haloformyl groups, haloformate groups and acid anhydride groups, etc. in the molecule. Preferred examples include isophthaloyl chloride, tri mesoyl chloride, terephthaloyl chloride, trimellitic acid chloride, trimellitic anhydride chloride, benzene-1, 3-disulfonyl chloride, picolinic acid chloride, 5-chlorosulfonyl isophthaloyl chloride, and piperazine-N,N-dicarboxylic acid dichloride. Trimesoyl chloride, trimellitic anhydride chloride, and isophthaloyl chloride are particularly preferable. Other crosslinkers would include multifunctional isocyanates.

polymer solids (DOW 238A), 0.25% by weight of the amino compound piperazine, and 0.5% by weight of sodium hydroxide. It was then immersed for 30 seconds in the organic phase solution, that is, a n-hexane solution of 1% crosslinkers i.e. 0.4% by weight of trimesoyl chloride and 0.6% by weight of isophthaloyl chloride. The substrate was removed, allowed to dry in air and then allowed to set overnight at room temperature. The resulting thin film-latex impregnated composite membrane was tested in a stirred R.O. test cell at 60 psi using a 300 ppm NaCl solution and also a test using 150 ppm $MgSO_4$ solution. The flux rate was measured in gallons of solution per sq. ft. of membrane per day(GFD).

EXAMPLE 2

A composite membrane was fabricated using the same procedure as described in Example 1 except no emulsion latex polymer of any kind was added to the aqueous reactant solution.

EXAMPLE 3

A composite membrane was fabricated using the same procedure as described in Example 1 except that the emulsion reducing latex polyisoprene (General Latex Corp.) replaced the butadiene-styrene latex.

EXAMPLE 4

A composite membrane was fabricted using the same procedure as described in Example 1 except that the emulsion latex Geon Vinyl Chloride latex (B. F. Goodrich #460×46) replaced the butadiene styrene latex. This latex contains no carbon-carbon double bonds in its structures.

EXAMPLE 5

A composite membrane was fabricated using the same procedure as described in Example 1 except the emulsion latex Hycar 2679 (an acrylic esters polymeric latex) [B. F. Goodrich #2679] replaced the butadiene styrene latex. This latex also contains no carbon-carbon double bonds in its structures.

Each of the above TFC membranes were tested over a 32 day period for:

1. Rejection and water flux in treating a 300 ppm NaCl solution in the presence of 200 ppm (maintained) chlorine at a pH range between 4.5 and 5.5.
2. Same as the above except a 150 ppm $MgSO_4$ solution was used.
3. Temperature of test was 20° C.±2° C.
4. All samples stored in the dark in sealed jars.

| Example | Emulsions used in AQ. Phase | Initial % Rejection 300 ppm NaCl | Flux(GFD) | 32 Day % Rejection 300 ppm NaCl | Flux(GFD) | Initial % Rejection 150 ppm $MgSO_4$ | Flux(GFD) | 32 Day % Rejection 150 ppm $MgSO_4$ | Flux(GFD) |
|---|---|---|---|---|---|---|---|---|---|
| 1 | Polystyrene-Butadiene | 86% | (15) | 50% | (55) | 94% | (21) | 56% | (55) |
| 2 | None | 50% | (9) | 3% | (482) | 69% | (11) | 2% | (511) |
| 3 | Polyisoprene | 65% | (17) | 48% | (59) | 80% | (22) | 69% | (51) |
| 4 | Geon-Vinyl Chloride | 53% | (22) | 4% | (377) | 51% | (18) | 1% | (472) |
| 5 | Hycar-Acrylic esters | 76% | (18) | 8% | (307) | 87% | (19) | 5% | (289) |

All of above exposures were at 150,000 ppm-hrs. of chlorine

EXAMPLE 1

A porous polyether sulfone substrate film on a woven polyester support fabric was evely coated (by immersion) with an aqueous phase solution containing 0.75% by weight of the reducing latex butadiene-styrene latex The table shows that those TFC membranes prepared with reducing latexes were much improved in their tolerance to chlorine contained in the feed solutions to be treated. The improvements, in terms of salt rejections were in the order of at least 10 fold.

Various modifications may be made to the procedures described herein as would be obvious to one having the ordinary skill in the art and such modifications are considered to be included within the scope of the invention, most especially those involving the use of emulsion having reducing polymers in the aqueous reaction bath heretofore described which is described by the claims appended hereto. Various features of the invention are set forth in the claims which follow.

I claim:

1. A thin film composite semipermeable membrane comprising a porous substrate having a chlorine or other oxidant tolerant surface layer of an ultrathin film formed by the polymerization of an aqueous mixture of a water emulsion containing a carbon-carbon double bond reducing polymer or other organic reducing polymers containing a phenolic or resorcinol group and an amino compound having at least two primary or secondary amino groups using a polyfunctional crosslinking agent capable of reacting with said primary or secondary amino groups.

2. The semipermeable membrane of claim 1 wherein said amino compound is selected from the group represented by formulas I to IV:

$R^1$—NH—A—NH—$R^2$     (Formula I)

wherein A represents an alkylene group having from 2 to 8 carbon atoms, a divalent alicyclic group, a divalent aromatic group, or a divalent heteroaromatic group, and $R^1$ and $R^2$ each represents an alkyl group having from 1 to 3 carbon atoms or H atoms;

Formula II

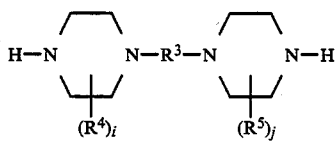

wherein $R^3$ represents an alkylene group having from 0 to 4 carbon atoms, $R^4$ and $R^5$ each represents an alkyl group having from 1 to 3 carbon atoms; and i and j each represents an integer of 0 to 4;

Formula III

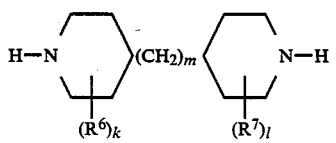

wherein $R^6$ and $R^7$ each represent an alkyl group having from 1 to 3 carbon atoms, k and l each represents an integer of 0 to 4, and m represents an integer of 0 to 4; and Formula IV

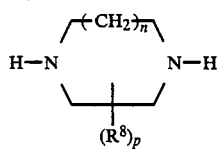

wherein $R^8$ represents an alkyl group having from 1 to 3 carbon atoms, n represents 0, 1 or 2, and p represents an integer of 0 to 4.

3. A composite semipermeable membrane according to claim 1, wherein said polyfunctional crosslinking reagent has 2 or more functional groups selected from acid halide groups, mixed acid halide acid anhydride groups, acid anhydride groups, N halo-formyl groups, haloformate groups, sulfonyl halide groups, isocyanate groups, and epoxide groups.

4. A composite semipermeable membrane according to claim 1, wherein said porous substrate is composed of polyether sulfone, polysulfone, polyvinylidene fluoride, or blends thereof.

5. A composite semipermeable membrane according to claim 1, wherein the porous substrate has a surface pore size of from 50 to 5,000 Å and wherein said ultrathin film comprised of a mixture of an unsaturated emulsion polymer and a polyamide has a thickness of from 50 to 1000 Å.

6. A composite semipermeable membrane according to claim 1 wherein said thin film is formed "in situ" on said porous substrate by interstitial polymerization, emulsion precipitation, or condensation.

7. A composite semipermeable membrane according to claim 1 wherein said reducing polymer is selected from the group consisting of a polymer or copolymer latex of resorsinal-formaldehyde, phenol-formaldehyde, hydroquinone formaldehyde, catechol formaldehyde, butadiene acrylonitrile, butadiene acrylonitrile styrene, styrene butadiene, isoprene (natural or synthetic), styrene butadiene (2 or 4) vinyl pyridine, and mixtures thereof.

8. The semipermeable membrane of claim 1 wherein said amino compound is selected from the group consisting of:

FORMULA I

N,N'-dimethylethylenediamine, N,N'-dimethylpropylenediamine, N,N'-dimethyl-m-phenylenediamine, N,N'-dimethyl-p-phenylenediamine, M-phenylenediamine, p-phenylenediamine, 2,6 dimethyl 4-aminopiperidine.

Formula II

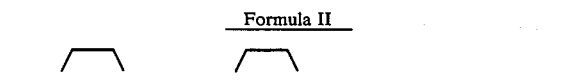

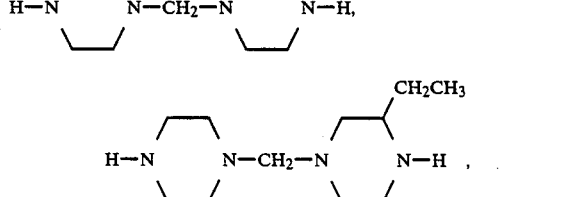

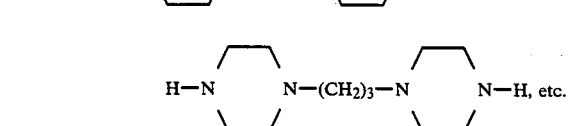

Formula III

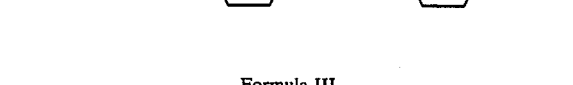

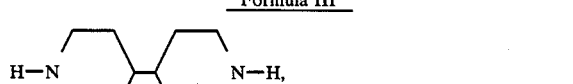

-continued
Formula III

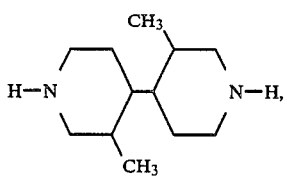

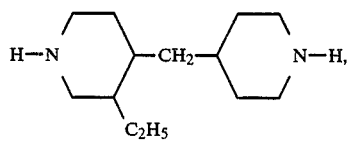

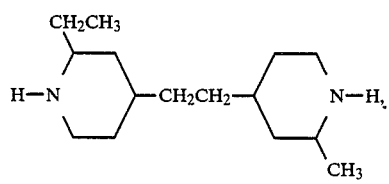

-continued
Formula III

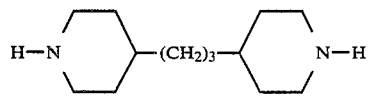

Piperazine, 2 methyl piperazine,
2,5-dimethylpiperazine, and mixtures thereof. (Formula IV)

9. A process of preparing a thin film composite semipermeable membrane having chlorine, hypochlorite or oxidant tolerance comprising coating a porous oxidation resistant substrate with an aqueous solution containing an emulsion or dispersion of water insoluble polymers or copolymers having reactibility with chlorine or other oxidants and a polyamino compound consisting of either primary or secondary amines having at least two primary or secondary amino groups, contacting said coated porous substrate with an organic solvent containing at least one polyfunctional crosslinking agent capable of reacting with said amino groups to crosslink said amino compound and thereafter heating the resulting structure of drive off solvent, deposit reducing latex, and cure the polyamide so as to form the thin film composite membrane.

* * * * *